United States Patent [19]

Jungbert

[11] Patent Number: 4,529,241
[45] Date of Patent: Jul. 16, 1985

[54] RAILROAD AXLE ASSEMBLY

[76] Inventor: Edward Jungbert, 12900 Osage Rd. N., Louisville, Ky. 40222

[21] Appl. No.: 505,285

[22] Filed: Jun. 17, 1983

[51] Int. Cl.³ .................. B60B 35/14; B60B 37/02; B60B 37/04
[52] U.S. Cl. .................................. 295/39; 295/38; 295/40
[58] Field of Search ............... 295/36 R, 37, 38, 39, 295/40

[56] References Cited

U.S. PATENT DOCUMENTS

| | | | |
|---|---|---|---|
| 10,471 | 1/1854 | Denny | 295/37 |
| 99,195 | 1/1870 | Hudner | 295/37 |
| 210,623 | 12/1878 | Murphy | 295/39 |
| 287,202 | 10/1883 | Walton | 295/39 |
| 387,197 | 7/1888 | Wright | 295/37 |
| 441,014 | 11/1890 | Mahood | 295/38 |
| 551,746 | 12/1895 | Denny | 295/39 |
| 683,001 | 9/1901 | Robeson | 295/38 |
| 1,610,641 | 12/1926 | Wilson, Sr. | 295/39 |
| 1,812,127 | 6/1931 | Wisner et al. | 295/37 X |
| 2,073,829 | 3/1937 | Brown | 295/38 |

*Primary Examiner*—David A. Scherbel
*Assistant Examiner*—Howard Beltran
*Attorney, Agent, or Firm*—Edward M. Steutermann

[57] ABSTRACT

Axle assembly for a railway or other types of track riding vehicle including a first axle member fixed to a first wheel to ride on one track and extending longitudinally outwardly from the wheel, with a groove adjacent the outermost end of the axle, a second wheel with a longitudinally, outwardly extending axle shaft fixed at one end to the second wheel where the outer end of the second axle shaft includes a generally cylindrical housing having an open to receive the outermost end of the first axle. A first plate is provided to be received on the open end of the housing and has a central aperture, of diameter generally equal to the diameter of the first axle member, so the first axle member extends therethrough and so the end of the first axle and the groove are located within the housing. A first bearing is of diameter generally equal to the inner diameter of the housing located within the housing to receive the outer end of the first axle to support the end of the first axle and a second thrust bearing having a diameter generally equal to the inner diameter of the housing is retained therein to also receive the end of the first axle so that the second bearing is located between the groove and the first plate. A retainer device is provided to be received in the groove within the housing to retain the axle from longitudinal outward movement with respect to the housing.

1 Claim, 2 Drawing Figures

U.S. Patent  Jul. 16, 1985  4,529,241
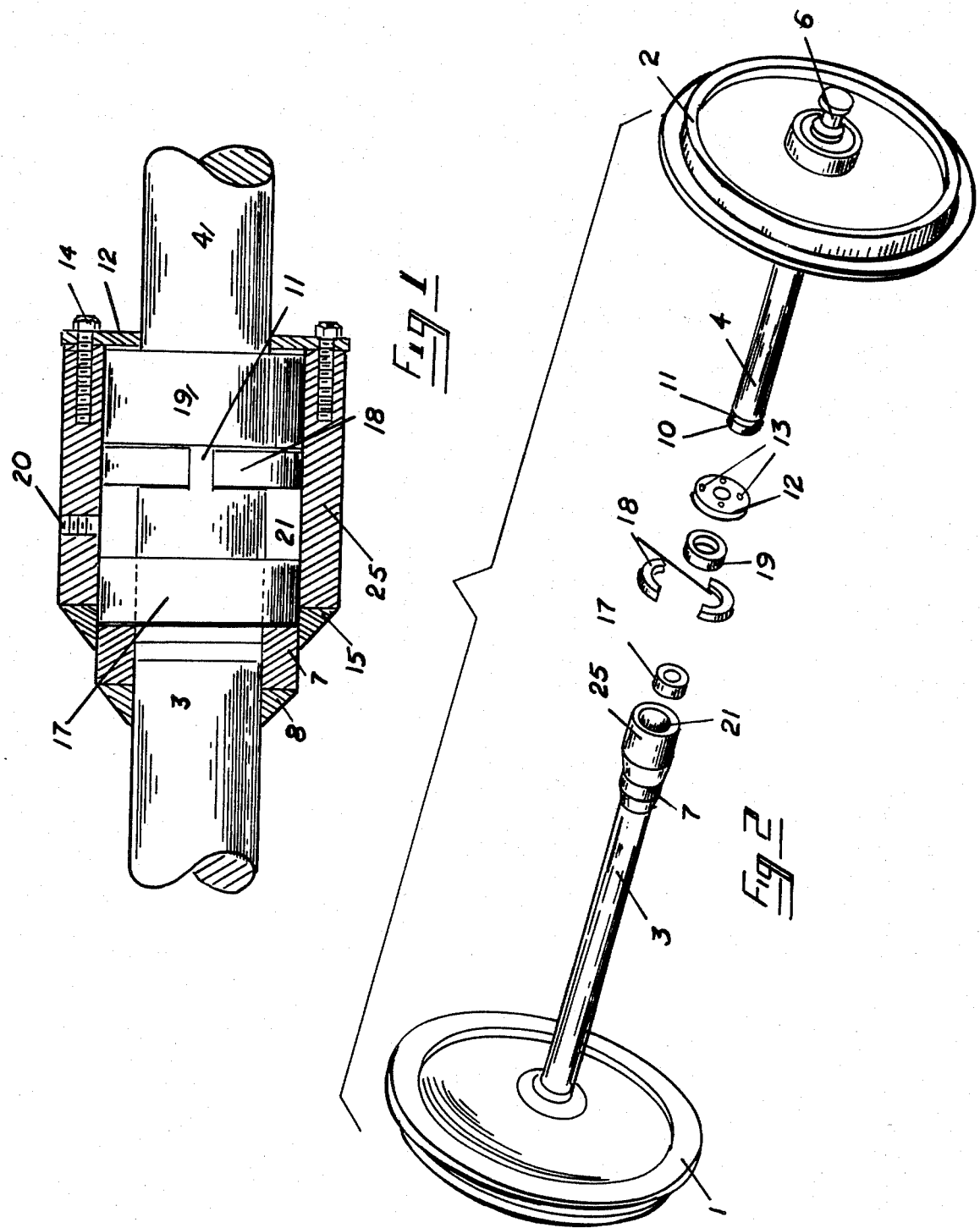

RAILROAD AXLE ASSEMBLY

BACKGROUND OF THE INVENTION

The present invention relates to axle construction for railway type vehicles which run on spaced parallel tracks where the wheels carried on the axle rotate freely and independently of each other or may rotate together.

Wheel and axle constructions in common use in the railroad industry today include wheels fixed at opposite ends of a one piece axle where the two wheels rotate in unison, that is the wheels operate at the same speed so that, for example, in negotiating a curve one of the wheels drags while the other one operates at a higher rate of speed. The accumulated drag occuring or resulting from the half of the wheels dragging around a curve substantially reduces the efficiency of the motive means utilized to pull the train. Further, the action tends to wear out the track, loosen the track from the cross ties, and leads to unnecessarily early failure of the wheels.

The problem has been addressed in several prior art arrangements including U.S. Pat. No. 683,001-Robeson where an axle box was provided with bearings for axle sections, where the axles are actually physically separated from each other and contained within a housing which extends the distance between the two wheels and is received in openings in the wheels.

U.S. Pat. No. 441,014-Mahood provides an arrangement where a split axle is provided with a housing which is connected directly to the rail car between the wheels. U.S. Pat. No. 1,812,127-Wisner provides an arrangement where an axle is provided to be received in a housing which extends fully between the wheels and a tubular axle section.

U.S. Pat. No. 2,073,829-Brown provides an arrangement where the wheels are carried by axle members received in a central housing where again the axle assembly is received within a tubular axle assembly which extends from wheel to wheel.

No prior art arrangement is known where a simple self supporting housing is provided centrally between the opposed wheels and where one axle is received in the other axle with appropriate bearing means to allow independent rotation of the two shafts.

SUMMARY OF THE INVENTION

The present invention provides an economical, straightforward axle arrangement for railway vehicles or other type vehicles riding on the spaced parallel tracks where the device can be easily substituted for existing equipment and where the device effectively improves the efficiency of the operation of a motive source and further reduces the wear and strain normally encountered by a railway type vehicle, particularly in negotiating a curve.

Further devices within the scope of the present invention inherently adjust for the differences in rate of natural rotation of inner and outer wheels going around curves of differing radius so that the overall operation of the equipment, including a train of equipment, is generally improved.

Additionally, it is recognized that devices in accordance with the present invention require minimal maintenance and can further be substituted for presently utilized equipment without major redesign of the trucks or other devices which retain wheel assemblies of the type contemplated hereby. In some instances existing equipment can be modified in accordance with the teachings of the present invention to provide the advantages of the present invention.

Axle assembly for a railway or other types of track riding vehicle which includes a first axle member fixed to a first wheel to ride on one track and extending longitudinally outwardly from the wheel, and having groove means adjacent the end thereof, a second wheel with a longitudinally, outwardly extending axle shaft fixed at one end to the second wheel and where the outer end of the second axle shaft includes an enlarged generally cylindrical housing having an open end adapted to receive the outermost end of the first axle member therewithin, a first plate device to be received on the open end of the housing and having a central aperture of diameter generally equal to the diameter of the first axle member so the first axle member extends therethrough and so the groove is located within the housing, first bearing means located within the housing to receive the outer end of the first axle and having a diameter generally equal to the inner diameter of the housing and received therein to support the end of the first axle and second thrust bearing means having a diameter generally equal to the inner diameter of the housing and received therewithin and having a bearing aperture generally equal to the diameter of the first axle to receive the first axle so that the second bearing is located between the groove and the first plate, and a retainer device adapted to be received in the groove means within the Embodiments of the present invention take various forms, all within the scope of the present invention; however, one example in accordance with the present invention is shown in the accompanying figures but it will be understood that the arrangement shown is not by way of limitation and that various other arrangements also within the scope of the present invention will occur to those skilled in the art upon reading the disclosure set forth hereinafter.

BRIEF DESCRIPTION OF THE DRAWINGS

In the one example in accordance with the present invention described herein:

FIG. 1 is a partly sectional view of a portion of the arrangement shown in FIG. 1 in assembled relation.

FIG. 2 is an exploded perspective view of one arrangement within the scope of the present invention; and

DETAILED DESCRIPTION OF THE DRAWINGS

Referring first to FIG. 2 which is an illustration of one arrangement within the scope of the present invention spaced wheels 1 and 2 are shown which can be railroad wheels as is known in the art. Wheel 1 carries an axle 3 while wheel 2 carries an axle 4. As shown in FIG. 2 with reference to the end of the axle assembly including axle 3 and 4 as described hereinafter, which carry the wheels 1 and 2 a journal 6 can be provided at the end of axle 4, and a similar journal (not shown) can be provided at the end of axle 3, by which the axles are mounted within the usual axle boxes of the associated truck or car (not shown).

A housing 7 of generally circular cross section is provided as shown, at the end of axle 3 and can, as for example shown in FIG. 2 be a cylinder welded to the end of axle 3 by a weld 8. Such an arrangement would permit the adaption of existing equipment to fall within the scope of the present invention.

Referring again to FIG. 1, axle 4 has an end section 10 to be received in housing 7 however it will be understood that in some arrangements the end of axle 4 could be of reduced diameter and received in a smaller bearing which would permit the size of housing 7 to be reduced all within the scope of the present invention.

In the arrangement shown in the drawings, a peripheral groove 11 is provided and spaced inwardly from end 10. A cap 12 is provided having aperture 13 to receive bolts 14 where the outer diameter of plate 12 is generally equal to the outer diameter of housing 7 so plate 12 is received on housing 7 as shown in FIG. 2 and secured by means of bolts 14. A central aperture 16 is provided in plate 12 to receive axle 4 therethrough so that end 10 is located in housing 7 as shown in FIG. 2. End 10 is received in a bearing 17, for example a thrust bearing such as a Timken TM bearing to support the end of the shaft 4 within housing 7 as shown in FIG. 2. A split ring 18 is provided to be received in groove 11 as shown in FIG. 2 to prevent relative lateral movement of axle 4 in an outward direction. The spacing between groove 11, which receives split ring 18, and the end 10 of axle 4 is sufficient to prevent lateral movement of axle 4 in the other direction because the portion 10 of section 9 is received by bearing 17. A second bearing 19 can be provided to receive shaft 4 in housing 7 and located between ring 18 and the inner surface of plate 12 to provide further support to the axle section as shown. It is understood that loading of the wheels 1 and 2 will cause the center portion of the axle assembly to be urged upwardly and bearings 17 and 19 are provided to accommodate such loading. Bearing 19 like bearing 17 can be a Timken TM bearing or other suitable configuration to permit rotation and/or prevent lateral movement and to provide the center forces required to hold the axles 3 and 4 in generally mutually aligned relation. It is recognized that loading of the axle assembly tends to urge the center of the axle in an upward direction but the force is resisted by the bearing assembly as previously described.

Within the scope of the present invention the assembly can be lubricated and in this regard an aperture 20 is provided to communicate with the chamber 21 defined by housing 7 and end plate 12 to receive a lubricant, for example grease or a suitable material. A plug (not shown) can be provided to be received in aperture 20 to retain the lubricating material therein.

It will be recognized that the foregoing is but one example in accordance with the present invention and that various other arrangements also within the scope of the present invention will occur to those skilled in the art upon reading the disclosure set forth hereinbefore.

The invention claimed is:

1. An axle assembly including a first axle means fixed to a first wheel to ride on a first track and extending longitudinally outwardly from said first wheel having groove means adjacent the end thereof, a second wheel having a longitudinally, outwardly extending second axle fixed at one end to said second wheel; an enlarged generally cylindrical housing having carried at the end of said second shaft having an open end of selected diameter adapted to receive the outermost end of the first axle member therewithin where said housing has smooth inner walls; cap means to be received on the open end of the housing and having a central aperture of diameter generally equal to the diameter of said first axle member so said first axle member extends therethrough and so said groove is located within said housing, first bearing means to receive the outer end of first axle and having a diameter generally equal to the inner diameter of the housing and received therein to support the free end of said first axle; second bearing means having a diameter generally equal to the inner diameter of the housing and received therewithin and having a bearing aperture generally equal to the diameter of said first axle to receive said first axle so said second bearing is located between said groove means and said cap; and, retainer means adapted to be received in said groove means within said housing to engage one side of said second bearing where a second side of said second bearing engages the side adjacent of said housing to retain the axle from longitudinal outward movement with respect to said housing.

* * * * *